3,764,346
SPRAY DRIED ESSENTIAL OIL COMPOSITION
Peter P. Noznick, Evanston, and Charles W. Tatter, Homewood, Ill., assignors to Beatrice Foods Co., Chicago, Ill.
No Drawing. Continuation-in-part of abandoned application Ser. No. 344,825, Feb. 14, 1964, and a division of application Ser. No. 719,766, Apr. 8, 1968, now Patent No. 3,628,968. This application Nov. 4, 1969, Ser. No. 874,075
Int. Cl. A23l 1/26
U.S. Cl. 426—213                5 Claims

ABSTRACT OF THE DISCLOSURE

A spray dried mixture is prepared from (1) a polyglycerol partial ester of a higher fatty acid, (2) water soluble starch, modified starch, dextrin, sucrose, glucose, maltose, lactose, gum arabic, larch gum or corn syrup solids having a D.E. value of at least 4, and (3) an essential oil.

---

This application is a continuation-in-part of application Ser. No. 344,825, filed Feb. 14, 1964, now abandoned, and is a division of application Ser. No. 719,766, filed Apr. 8, 1968 and now U.S. Pat. No. 3,628,968.

The present invention relates to emulsified mixtures of fats and carbohydrates.

It is normally difficult to make stable emulsions of sugars such as sucrose and dextrose containing syrups, e.g. corn syrup, with fats, particularly liquid fats in water. Thus the Schoch patent, 2,876,160, shows that corn syrups with a D.E. value of 30 and above are unsatisfactory as dispersing agents for oils. The file history of the Schoch patent further shows that corn syrups with a D.E. value as low as 24 are unsatisfactory for making dispersed products. This is true even though Schoch can add a surface active agent as an emulsifier to his formulations.

It is an object of the present invention to prepare novel stable aqueous emulsions of fats and carbohydrates.

Another object is to prepare stable aqueous emulsions of fats with corn syrups having a D.E. value of 24 to 80.

An additional object is to prepare stable aqueous emulsions of fats with sucrose containing formulations.

A further object is to prepare dry powders from aqueous emulsions of fats with carbohydrates, preferably corn syrups having D.E. values of 30 or above and/or sucrose.

Yet another object is to prepare such emulsions and dry powders without the use of protective colloids.

Another object is to spray dry mixtures of fats and corn syrup and/or sucrose having unusually high amounts of sugar.

A still further object is to provide an improved chocolate containing edible dry whipping composition.

Another object is to provide a chocolate containing dry whipping composition which, upon addition to a liquid such as water, whole milk, whole homogenized milk, or skim milk, will whip up immediately and remain stable in whipped form for prolonged periods of time.

It is still another object of the present invention to provide a method for preparing improved edible dry fat-carbohydrate compositions, e.g. dry whipping compositions containing chocolate.

Another object is to prepare novel spray dried mixtures of fats and colloidal carbohydrates.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing polyglycerol esters of fatty acids as the emulsifying agents. While polyglycerol esters from diglycerol to triconto (30 glycerol units) glycerol esters of fatty acids can be employed there are preferably employed triglycerol to decaglycerol esters of higher fatty acids (e.g. containing 12 to 22 carbon atoms in the fatty acid). The most suitable polyglycerol esters are partial esters, i.e. they have one or more free hydroxyl groups and hence have both hydrophilic and lipophilic characteristics.

Examples of suitable polyglycerol esters are triglycerol monosterate, triglycerol monoshortening (triglycerol mono ester of the acids of cottonseed oil), triglycerol monooleate, hexaglycerol monostearate, hexaglycerol monoshortening, hexaglycerol monooleate, hexaglycerol dioleate, hexaglycerol dishortening, hexaglycerol hexaoleate, decaglycerol monostearate, decaglycerol monoshortening, decaglycerol monooleate, decaglycerol monolaurate, decaglycerol tristearate, decaglycerol tri shortening, decaglycerol trioleate, decaglycerol trilinoleate, decaglycerol decasterate, decaglycerol decaoleate, decaglycerol deca linoleate, decaglycerol tetraoleate, diglycerol monostearate, dodecaglycerol hexapalmitate decaglycerol tripalmitate, decaglycerol di arachinate, triglycerol mono behenate, dodecaglycerol tri lignocerate, decaglycerol mono linolenate, hexaglycerol di ricinoleate, decaglycerol deca myristate, decaglycerol tri ester of soybean oil acids, decaglycerol tetra ester of cottonseed oil acids, hexaglycerol mono ester of coconut oil acids, triglycerol mono ester of peanut oil acids, decaglycerol deca ester of corn oil acids, decaglycerol ester deca ester of hydrogenated cottonseed oil acids.

The polyglycerol esters are useful in giving stable emulsions and uniform, non-sticky spray dried products in three groups of products in which the essential materials are:

(I) fat, carbohydrate and polyglycerol ester
(II) fat, carbohydrate, colloidal stabilizer and polyglycerol ester
(III) fat, colloidal stabilizer and polyglycerol ester.

Conventional additional materials can also be present in the emulsions and spray dried products.

The term fat as used in the present specification and claims includes both liquid and solid fats. Among the suitable edible fats which can be used are cottonseed oil, safflower oil, corn oil, soybean oil, butterfat, coconut oil, peanut oil, lard, hydrogenated cottonseed oil, hydrogenated corn oil, hydrogenated soybean oil, hydrogenated peanut oil, olive oil, hydrogenated olive oil, hydrogenated coconut oil, e.g. hydrogenated to a melting point of 92° F.

The polyglycerol ester is used in the compositions of the present invention in an amount of 0.5–30%, preferably about 2 to 3% of the fat. In some instances it is desirable to use up to 10% of the polyglycerol ester based on the fat.

Unless otherwise indicated, all parts and percentages in the present specification and claims are by weight.

As the carbohydrate there can be used corn syrups with D.E. values of at least 4 and which can be 24 to 70 or higher, molasses, maltose, ribose, galactose, xylose, arabinose, honey, lactose, sucrose, dextrin, water soluble starch, pregelatinized starch, gum arabic, larch gum arabinogalactan (Stractan), d-glucose, modified starches of the types set forth in Schoch patent, 2,876,160, e.g. hypochlorite-oxidized cornstarch, torrefaction or roasted dextrins, e.g. canary dextrins, yellow dextrins and British gums having a solubility in cold water of at least 80%, thin boiling oxidized starches, e.g. those having a Scott hot paste viscosity of about 45 to 90, etherified starches including hydroxyethyl, hydroxypropyl, methyl and ethyl derivatives having a degree of substitution of 0.04 to 0.25 ether group per glucose unit as well as acid or oxidation modified etherized starches, starch esters, e.g. starch acetate and starch sulfonate, waxy maize starch, waxy sorghum starch, hydroxyethyl torrefaction dextrin, converted starches having a D.E. value of 4 to 20.

The invention is of particular value in forming stable emulsions and spray dried products from mixture of fats with converted starches or sugars that cannot be employed in Schoch. Such converted starches include corn syrups having D.E. values of 24 to 70 (e.g. 42) and higher. Thus there can be spray dried emulsions containing 20 to 50% fat with 80 to 20% of d-glucose and/or sucrose with lactose, e.g. where the lactose is 20 to 50% of the total of glucose and/or sucrose and lactose by using the polyglycerol esters as emulsifying agents.

The fat is normally 5 to 75% based on the total of fat and carbohydrate.

While corn syrup having a D.E. value of 15 to 60 or 70 is commonly used as the carbohydrate, there can be employed syrups of the same D.E. value prepared from tapioca, wheat, rice, sorghum, sago, potato, arrowroot, waxy maize or waxy sorghum starches or mixtures of these converted starches with each other or corn syrups.

It has been found that surprisingly very stable aqueous emulsions are prepared from the mixture of fat and corn syrups of D.E. values 24 and above and the sugars, even without using colloidal carbohydrates or proteins. Surprisingly, it is also possible to spray dry such compositions in the absence of colloidal carbohydrates and proteins. Thus good results have been obtained in spray drying mixtures of 50% of sugar or corn syrup, D.E. value 42, and 50% of cottonseed oil.

In order to obtain the best spray dried compositions containing large amounts, e.g. 50% or more of difficultly driable carbohydrates such as products containing large amounts of sucrose or dextrose or corn syrups of D.E. value 24 and above, based on the total of carbohydrate and fat, it is frequently desirable to add in addition to the polyglycerol ester 0.05–5%, preferably 0.2–2%, of a colloidal carbohydrate stabilizer based on the dry weight of the composition.

Such colloidal carbohydrate stabilizers include cellulose ethers such as methyl cellulose, e.g. Methocel MC (dimethyl ether of cellulose having 1.64–1.92 methoxy groups per glucose unit), mixed methyl hydropropyl cellulose, e.g. Methocel 90 HG (an etherified cellulose having 1.08–1.42 methoxy groups and 0.1–0.3 hydroxypropyl groups per glucose unit) and Methocel 65 HG (an etherified cellulose having 1.61–1.75 methoxy groups and 0.1–0.18 hydroxypropyl groups per glucose unit), carboxymethyl cellulose, low methoxy pectin, i.e. pectin having a methoxyl content of 2.5–4.5%, inulin, guar, Irish moss (carragheen), sodium alginate, gum tragacanth, gum karaya and locust bean gum.

In preparing emulsions of the products in groups (I) and (II) supra, the water is generally 40 to 95% and the solids 60 to 5%. In preparing emulsions of the products of group (III), the concentration of solids is generally quite low, e.g. 2–10% solids and 98–90% water.

The mixtures are pasteurized in conventional fashion, e.g. at 140–165° F. for 40–20 minutes, usually 155–160° F. for 30 minutes. The pasteurization conditions are not critical. Conveniently pasteurization is carried out at above the melting point of the fat.

The emulsions are homogenized in conventional fashion to a particle size between >1 to 10 microns. For many uses the particle size of the emulsified material is not over 5 microns although in preparing whipping products the particle size is usually somewhat larger, e.g. 3 to 8 microns.

Homogenization is carried out in conventional fashion at about the pasteurization temperature at pressures which can vary from 100 p.s.i. to 2000 p.s.i. or somewhat higher. Preferably the homogenization pressure is not over 2500 p.s.i. and in the examples unless otherwise indicated was 1500 p.s.i.

The emulsified, homogenized products are spray dried in commercial apparatus to give a particle size of 50 to 200 microns.

It has been found that when gum arabic is the carbohydrate it is possible to have up to 75% fat based on the total of fat and carbohydrate whereas when dextrins are the carbohydrate, the percent fat can be up to 65–70%. With corn syrup D.E. value of 42 there can be used up to 60% fat with 40% of the corn syrups.

The polyglycerol esters of the present invention aid the carbohydrate gums in entrapping fat better than the gums alone. They also have been found to prevent volatiles from going off in clouds and similar essential oil-containing formulations.

The compositions of the present invention are useful as shortening compositions, whipping compositions, clouds, etc.

EXAMPLE 1

A mixture of 50% cottonseed oil, 48.5% of corn syrup 42 D.E. and 1.5% of decaglycerol monostearate were pasteurized at 155–160° F. for 30 minutes and homogenized in water at 35% total solids. The product was then spray dried. It was found that a good coating of the corn syrups on the oil was obtained. This was surprising since normally the cottonseed oil is tough to coat properly.

EXAMPLE 2

Stable homogenized and emulsified mixtures were made from each of the following compositions in water.

|  | a | b | c | d | e |
|---|---|---|---|---|---|
| Decaglycerol tristearate | 1.5 | 1.5 | 1.5 | 1.5 | 1.5 |
| Cottonseed oil | 5 | 10 | 30 | 40 | 50 |
| Corn syrups 42 D.E. | 93.5 | 88.5 | 68.5 | 58.5 | 48.5 |

In each case water was added to give 35% solids. The mixtures were then spray dried at a particle size of about 125 microns.

In place of the 42 D.E. corn syrups in Examples 2(a), 2(b), 2(c), 2(d) and 2(e), there were also used corn syrups of 15 D.E. and 70 D.E. to successfully obtain spray dried products.

EXAMPLE 3

|  | Parts |
|---|---|
| White Crest (hydrogenated cottonseed oil) | 59.0 |
| Decaglycerol tetraoleate | 1.0 |
| Mono and diglycerides | 4.8 |
| Glycerol lacto monopalmitate | 3.1 |
| Glycerol monooleate | 0.6 |
| Sodium caseinate | 6.25 |
| Cane sugar | 12.5 |
| Frodex 15 (corn syrup 15 D.E.) | 12.5 |
| Sodium alginate | 0.05 |
| Salt | 0.225 |

This mixture was pasteurized, emulsified and homogenized at 50 p.s.i. in water at 155–160° F. at 55% total solids and was then spray dried to give a whip topping.

A similar product can be obtained by omitting the glycerol monooleate.

The mono and diglycerides employed was a standard commercial product composed of about 40 to 42% mono glycerides, 43 to 45% diglycerides and the remainder triglycerides. The mono and diglyceride product itself is not a polyglycerol ester but instead is a mixture of materials such as glycerol monostearate and glycerol distearate.

The glycerol lactomonopalmitate can be replaced by propylene glycol monostearate, glycerol lacto monooleate, glycerol lacto monostearate, propylene glycol monopalmitate, dipropylene glycol monostearate or the like.

Alternatively, this ingredient can be omitted completely and replaced by 3.1 parts of decaglycerol tristearate.

Instead of sodium caseinate, say protein or non-fat milk solids or skim milk can be employed to increase the whipping effect. About 1 to 15% by weight of the finished dry mix of this constituent is used.

While water is normally employed in which to make the emulsion, there can also be employed sweet skim milk.

There can be added vanilla or other desired flavors as well as edible colorants, e.g. beta carotene.

The spray dried whip can be reconstituted in water, skim milk, whole milk and whipped either with an electric or a hand beater.

EXAMPLE 4

| | Parts |
|---|---|
| Corn syrup solids, 37 D.E. | 71.5 |
| Corn oil | 26.5 |
| Decaglycerol tristearate | 0.5 |
| Methocel MC (25 cps. grade) | 0.5 |
| Water sufficient to make 35% total solids. | |

The corn syrup solids and water were heated to 140° F. and the decaglycerol tristearate and Methocel dispersed in the corn oil were added. The mixture was stirred for 10–15 minutes and then at a temperature of 130–135° F. the mixture was homogenized in two stages, the pressure in the first stage was 2000 p.s.i. and in the second stage 500 p.s.i. The homogenized mixture was spray dried to give a non-tacky product. The product was useful in products where protein is not desired, e.g. in a dietetic food product. It also was useful in reconstituted foods such as clouds.

EXAMPLE 5

| | Parts |
|---|---|
| Butterfat | 58.75 |
| Decaglycerol decastearate | 1.25 |
| Frodex 24 (corn syrup solid 24 D.E.) | 39.5 |
| Sodium caseinate | 0.5 |

The sodium caseinate was added to give more coating to the material encasing the fat but it can be eliminated.

The above mixture was emulsified, pasteurized and homogenized in water at 35% total solids and spray dried to give a dry non-tacky product which was suitable for use where a butter flavor is desired. Thus in one case it was sprinkled over popcorn.

When using a mixture of (a) sugar, (b) fat and (c) the polyglycerol ester emulsifier, it has been found preferable to use decaglycerol monoesters such as decaglycerol monostearate. With more complex systems wherein dextrin or gum arabic is employed to replace all or part of the sugar, then polyglycerol esters having intermediate functionality (hydrophilic-lipophilic characteristics) such as decaglycerol decastearate and decaglycerol hexastearate are preferred. If a more hydrophilic emulsifier is desired then there is used a material such as decaglycerol tristearate.

It has been found, as a rule, that the use of higher polyglycerol esters, e.g. decaglycerol decastearate, gives superior dry powders to those obtained with lower polyglycerol esters, e.g. triglycerol monostearate, although the latter can be employed to give operative results.

EXAMPLE 6

A mixture of 50 parts hydrogenated cottonseed oil, 50 parts corn syrups 65 D.E. emulsified with 2 parts of decaglycerol hexastearate at 50% solids was emulsified in water, pasteurized at 155° F. for 30 minutes, homogenized at 500 p.s.i. and spray dried to give a good dry product.

EXAMPLE 7

| | Parts |
|---|---|
| Orange oil (an essential oil) | 19.5 |
| Decaglycerol tristearate | 0.5 |
| Gum arabic (containing 12% moisture) | 80.0 |

This mixture was emulsified at 35% solids in water and spray dried to give a product which did not give off as much of the essential oil as products which were spray dried without the polyglycerol ester. Additionally the product made with the polyglycerol ester was not as dusty but more granular and hence recovery was better.

The emulsion prior to spray drying was more stable than conventional orange oil-gum arabic emulsions and hence could be used for a longer period of time before spray drying.

When the decaglycerol tristearate in Example 7 was replaced by the same amount of decaglycerol monostearate, a similar spray dried product was obtained.

EXAMPLE 8

| | Parts |
|---|---|
| Drew Cobee 110 (a hard fat which is a combination of hydrogenated cottonseed oil and coconut oil, M.P. 110–114, iodine value 0.2 max.) | 19.5 |
| Decaglycerol tristearate | 0.5 |
| Gum acacia (dry) | 65.0 |
| Cane sugar | 15.0 |

This mixture was made up in water to 35%, emulsified, pasteurized and spray dried to form a clouding agent.

EXAMPLE 9

| | Parts |
|---|---|
| 76° coconut oil | 70 |
| Decaglycerol tristearate | 3 |
| Milk solids (non-fat) | 26 |

Water was added to make 35% solids. The emulsion was pasteurized for 30 minutes at 155–160° F., homogenized at 1500 p.s.i. and spray dried to a non-tacky powder.

EXAMPLE 10

| | Parts |
|---|---|
| White Crest (hard fat) | 59.6 |
| Decaglycerol tetraoleate | 1.0 |
| Mono and diglycerides | 4.8 |
| Glycerol lacto palmitate | 3.1 |
| Sodium caseinate | 6.25 |
| Frodex 15 (corn syrups 15 D.E.) | 12.5 |
| Cane sugar | 12.5 |
| Sodium alginate | 0.5 |
| Salt | 0.225 |

Water was added to give 55% solids. The emulsion was pasteurized at 155–160° F. for 30 minutes, homogenized at 500 p.s.i. and spray dried.

The powder thus prepared in an amount of 57 grams was whipped up with ½ cup milk in an electric mixer to give a whipped topping. A good consistency whip was obtained in 2 minutes.

EXAMPLE 11

| | Parts |
|---|---|
| 92° coconut oil | 19.8 |
| Decaglycerol tristearate | 0.2 |
| Decaglycerol decastearate | 0.2 |
| Sodium caseinate | 1.8 |
| Di potassium phosphate | 0.32 |
| Salt | 0.08 |
| Gum carragheen | 0.03 |
| Guar gum | 0.05 |
| Frodex 24 (corn syrup 24 D.E.) | 17.70 |
| Beta carotene | 0.0012 |

The mixture was emulsified in water at 35% solids, pasteurized in conventional fashion, homogenized at 2500 p.s.i. and spray dried to give a coffee whitener.

EXAMPLE 12

| | Parts |
|---|---|
| Corn syrup solids, 37 D.E. | 71.5 |
| Butterfat | 26.5 |
| Decaglycerol tristearate (emulsifier) | 0.5 |
| Methocel MC (100 cps. grade) | 0.5 |

The corn syrups solids and water were heated to 140° F. Then there were separately added the butterfat, emulsifier and Methocel to give an emulsion containing 55% solids. The mixture was held at 140–145° F., for 20 minutes, homogenized at 1000–1500 p.s.i. and spray dried to give a product suitable as a popcorn coating. The product homogenized and spray dried very easily.

EXAMPLE 13

| | Parts |
|---|---|
| Butterfat | 35.0 |
| Decaglycerol tristearate | 0.5 |
| Frodex 15 (corn syrup 15 D.E.) | 63.0 |
| Methocel MC (100 cps. grade) | 0.5 |

The procedure of Example 12 was repeated using a homogenization pressure of 1500 p.s.i. The produce dried even better than that of Example 12. While Methocel was used as a drying aid in Examples 12 and 13, it can be eliminated in either of these examples and a good spray dried product is still obtained.

EXAMPLE 14

| | Parts |
|---|---|
| Chocolate liquor (Dutch process) | 34.6 |
| Butterfat | 5.6 |
| Milk solids (non-fat) | 13.6 |
| Cane sugar | 30.2 |
| Corn sugar | 10.4 |
| Mono and di glycerides | 2.2 |
| Decaglycerol tristearate | 1.4 |
| Sodium caseinate | 2.0 |
| Cocoa color | 0.5 |

The above formulation was mixed in water to give a 55% solids content. The fluid mix was pasteurized at 145° F. for 30 minutes, homogenized at 500 p.s.i. at the pasteurization temperature, and spray dried through a 0.035 inch nozzle. Upon reconstitution with water the mix whipped rapidly.

Effective whips were also prepared by omitting both the sodium caseinate and the cocoa color from the formulation of Example 14.

As stated in our parent application chocolate normally interferes with the whipping properties of edible whipping compositions. The chocolate has a depressing action on the whip due largely to the presence of large amounts of free fat in the chocolate or cocoa which is used.

By preparing a mixture of chocolate liquor or cocoa, the polyglycerol ester whipping agent of the present invention alone or with other whipping agents such as propylene glycol monostearate or glycerol lactopalmitate, sweetener and proteinaceous coating ingredient, adding water in an amount to give a 35–60%, preferably 45–55% solids content, pasteurizing, homogenizing and finally spray drying the mixture the depressing action of chocolate on whipping properties of the composition is obviated.

The chocolate whipping composition usually contains 10 to 40, preferably 20 to 35% of chocolate liquor or cocoa on the weight of the final dry mix. Chocolate liquor is the solid or plastic mass obtained by grinding cacao nibs and contains not less than 50% cacao fat (cocoa butter). Cocoa is chocolate which has been deprived of a portion of its fat and then pulverized. Cocoa ordinarily contains 20 to 30% of the original cacao fat. Dutch process chocolate liquor and cocoa are prepared by treating chocolate or cocoa with 3 parts of potassium carbonate or other alkali carbonate per 100 parts of cacao nibs.

The mono and diglycerides are used in an amount of 1 to 10% of the finished dry mix.

The polyglycerol esters, singly or in admixture with propylene glycol mono stearate, dipropylene glycol mono-stearate, glycerol lactoleate, glycerol lacto palmitate, glycerol lactostearate or the like are used in an amount of 0.5 to 10% of the finished dry mix.

The sweetener can be cane sugar, beet sugar, lactose or any form of diglucose, e.g. corn sugar or corn syrups. Mixtures of these sweeteners can be used. Usually only 15 to 50% of sweetener is used on the finished dry weight of the mix.

The proteinaceous coating ingredients include such materials as sodium caseinate and non-fat milk solids and are used in amounts from 4 to 20% of the finished dry mix. Other suitable proteinaceous materials include buttermilk solids, whey solids, egg yolks, gelatin, whole eggs and water soluble soy protein. Carbohydrate gums can be used in conjunction with the proteinaceous materials.

Additional fat can be included. Thus any of the fats mentioned previously can be added. Hydrogenated cottonseed oil and hydrogenated soybean oil are especially suited as other bland edible oils melting between 72° F. and 130° F.

Stabilizers can also be added in an amount of 0.02 to 1.0% of the finished dry mix. The stabilizers appear to increase the stiffness of the whip. Any of the stabilizers set forth previously can be used, e.g. sodium alginate, algin, guar gum, caragheen, methyl cellulose, carboxymethyl cellulose, gum tragacanth, gum acacia, gum karaya and locust bean gum.

Other optional stiffening and flavor imparting ingredients include potassium acid tartrate, tetrasodium pyrophosphate, tartaric acid and citric acid. From 0.02 to 1% of these materials based on the final dry mix are used. The amount employed should be such that the pH of the liquid mix is not reduced below 5.0.

Cocoa color and salt can be added to the formulation if desired.

In preparing the dry chocolate whipping compound, the ingredients are mixed and added to water, preferably to give a solids content from 45 to 55%, although this solids content can be varied as set forth supra. The fluid mix is then pasteurized. The temperature is preferably kept at 165° F. or below to prevent denaturation of the protein. Thus temperatures of 140 to 165° F. for 30 to 25 minutes are frequently used. After pasteurization, the liquid mixture is homogenized, e.g. at 500 p.s.i. at the pasteurization temperature to give a particle size of 3 to 10 microns and then spray dried to a particle size of 50 to 200 microns. The powdered product can then be packaged for sale.

Homogenization is normally carried out at low pressures, e.g. 100 to 800 p.s.i. and preferably at 500 to 600 p.s.i.

During the process the chocolate or cocoa and any added fat combine with the mono and diglycerides and the polyglycerol ester. Particles of this mixture are encased in the proteinaceous material, carbohydrate sweetener and other non-fat ingredients.

In whipping up the spray dried product ½ cup of whole milk, skim milk or water is placed in a "Mix-master" or other electric mixing machine bowl and 57 grams (2 ounces) of the dry powder are stirred slowly into the liquid in the bowl until thoroughly mixed. The mixing device is operated at high speed until the desired whipped body is reached, usually 2 to 4 minutes. A hand whipping device can also be employed.

In combining the powder with water to make a whippable mix, there can be used from 45 to 85% water with 55 to 15% powder, preferably 35% powder and 65% water. With sweet milk from 60 to 85% milk with 40 to 15% powder, preferably 70% sweet milk and 30% powder are used and with skim milk there can be used 50 to 85% skim milk with 50 to 15% powder, preferably 65% skim milk and 35% powder.

This powder is a very excellent whipping material of good keeping qualities and useful to form a whippable body in many food products, including custards, ice cream, puddings, toppings, fillings and icings, etc., and also can be used as an instant ice cream base.

EXAMPLE 15

| | Parts |
|---|---|
| Chocolate liquor (Dutch process) | 19.2 |
| Hydrogenated cottonseed oil | 47 |
| Mono and diglycerides | 3.8 |
| Decaglycerol tristearate | 3.0 |
| Sodium caseinate | 5.8 |
| Corn sugar | 11.05 |
| Cane sugar | 9.85 |
| Sodium alginate | 0.04 |
| Salt | 0.18 |

The procedure of Example 14 was repeated with satisfactory results.

EXAMPLE 16

| | Parts |
|---|---|
| Chocolate liquor (Dutch process) | 34.6 |
| Butterfat | 5.6 |
| Milk solids (non-fat) | 13.6 |
| Cane sugar | 30.2 |
| Corn sugar | 10.0 |
| Mono and diglycerides | 2.2 |
| Triglycol monostearate | 1.4 |

The procedure of Example 14 was repeated with satisfactory results.

EXAMPLE 17

| | Parts |
|---|---|
| Chocolate liquor (Dutch process) | 46.1 |
| Butterfat | 7.5 |
| Milk solids (non-fat) | 18.1 |
| Cane sugar | 13.9 |
| Corn sugar | 6.7 |
| Mono and diglycerides | 2.9 |
| Hexaglycerol dioleate | 1.9 |
| Sodium caseinate | 2.3 |
| Cocoa color | 0.6 |

The procedure of Example 14 was repeated, to 75% of the spray dried product being added 25% cane sugar.

EXAMPLE 18

| | Parts |
|---|---|
| Cocoa | 21.00 |
| Hydrogenated cottonseed oil | 47.40 |
| Mono and diglycerides | 3.90 |
| Decaglycerol tristearate | 2.92 |
| Sodium caseinate | 5.00 |
| Corn sugar | 9.67 |
| Cane sugar | 9.89 |
| Salt | 0.18 |
| Sodium alginate | 0.04 |

The procedure of Example 14 was repeated with very satisfactory results.

EXAMPLE 19

| | Parts |
|---|---|
| Dutch chocolate liquor | 46.1 |
| Hydrogenated cottonseed oil | 5.7 |
| Milk solids (non-fat) | 18.0 |
| Corn syrup solids (37 D.E.) | 13.9 |
| Cane sugar | 6.7 |
| Mono and di glycerides | 4.0 |
| Polyglycerol ester | 3.0 |
| Sodium caseinate | 2.3 |
| Salt | 0.2 |
| Sodium alginate | 0.1 |

In Example 19(a) the polyglycerol ester was decaglycerol tetraoleate, in Example 19(b) it was the tri esters of cottonseed oil acids with decaglycerol, in Example 19(c) it was hexaglycerol dishortening and in Example 19(d) it was decaglycerol decastearate. In each of Examples 19(a), 19(b), 19(c) and 19(d) the mixture was made up in water to 55% total solids, pasteurized at 150° F. for 30 minutes, homogenized at 500 p.s.i. to 3-8 microns and spray dried at 50-200 microns. In each case an excellent spray dried product was obtained. Each of the spray dried products of Examples 19(a), 19(b), 19(c) and 19(d) was made up to 50% solids in water and whipped with a Mixmaster mechanical beater. All four products whipped satisfactorily with Example 19(b) giving the best whipped product.

In another set of experiments the spray dried products of Examples 19(a), 19(b), 19(c) and 19(d) were each cut back with 25% cane sugar based on the total solids. Each of the cut back products were successfully whipped at 50% solids in water.

EXAMPLE 20

| | Parts |
|---|---|
| Acid whey solids | 73.5 |
| Liquid corn oil | 24.5 |
| Decaglycerol tristearate | 0.5 |
| Methocel MC (100 cps. grade) | 0.5 |

Water was added to give 35% solids and the mixture homogenized and spray dried easily.

EXAMPLE 21

| | (a) | (b) |
|---|---|---|
| Acid whey, parts | 85.0 | 90.0 |
| pregelatinized starch, parts | 14.0 | 8.0 |
| Decaglycerol tristearate, parts | 1.0 | 1.0 |

Each of Examples 21(a) and 21(b) was made up to 35% total solids in water, homogenized and easily spray dried.

EXAMPLE 22

| | Parts |
|---|---|
| Acid whey solids | 75.0 |
| Dextrine (Globe white) | 19.5 |
| Lipolyzed butter oil | 5.0 |
| Decaglycerol tristearate | 0.5 |

The mixture was made up to 35% solids in water, homogenized and easily spray dried. The fact that this product could be easily spray dried was surprising since the homogenized mixture had the high acid pH of 4.38.

EXAMPLE 23

| | Parts |
|---|---|
| Peanut butter | 94.0 |
| Milk solids (non-fat) | 4.0 |
| Decaglycerol monostearate | 1.0 |

Water was added to give 35% total solids. An excellent stable emulsion was obtained on homogenization.

EXAMPLE 24

| | (a) | (b) | (c) |
|---|---|---|---|
| Hydrogenated cottonseed oil, parts | 49.0 | 71.0 | |
| Decaglycerol decastearate, parts | 1.0 | 2.0 | 1.0 |
| Dextrin, parts | 50.0 | | |
| Sodium caseinate, parts | | 2.0 | 0.5 |
| Frodex 15 (corn syrups 15 D.E.), parts | | 24.0 | 49.5 |
| Unsalted butterfat, parts | | | 49.0 |

Example 24(a) was a formulation extremely high in fat with no protein or carbohydrate gum. Example 24(b) was a formulation very extremely high in fat with little protein. Example 24(c) was a formulation extremely high in butterfat using as little casein as possible. All of these formulations using conventional emulsifiers in place of the polyglycerol ester could not be homogenized and spray dried satisfactorily. However, using the decaglycerol decastearate each of Examples 24(a), 24(b) and 24(c) was readily homogenized in water at 35% solids content (and also at 55% solids content) and each of the homogenized aqueous emulsion was readily spray dried for use by a customer.

EXAMPLE 25

A mixture of 50 parts lactose, 48.5 parts hydrogenated cottonseed oil and 11.5 parts of decaglycerol tristearate was homogenized at 55% solids in water and readily spray dried. The addition of 0.2 part of Methocel MC as a drying aid made an even more readily spray driable formulation. Similarly Methocel HG was a suitable drying aid.

EXAMPLE 26

| | Parts |
|---|---|
| Hydrogenated cottonseed oil | 30 |
| Cane sugar | 50 |
| Lactose | 17 |
| Methocel MC (15 cap. grade) | 1 |
| Decaglycerol tristearate | 3 |

This mixture was homogenized and pasteurized at 150° F. and 55% solids in water and then was spray dried. It was surprising that a satisfactory spray dried product could be produced with such a large amount of cane sugar in the formulation.

EXAMPLE 27

| | Parts |
|---|---|
| Cane sugar | 40 |
| Lactose | 27 |
| Decaglycerol tetraoleate | 1 |
| Cottonseed oil | 29 |
| Methocel (15 cps. grade) | 2 |

This mixture was homogenized and pasteurized at 55% solids in water and successfully spray dried.

EXAMPLE 28

| | Parts |
|---|---|
| Hydrogenated cottonseed oil | 3.1 |
| Decaglycerol decastearate | 36.5 |
| Decaglycerol monostearate | 9.5 |
| Milk solids (non-fat) | 35.9 |
| Cane sugar | 10.0 |
| Pregelatinized starch | 5.0 |

This sample was made up as a 35% total solids in water, pasteurized and homogenized and spray dried. There was no separation of the emulsion prior to spray drying and a good product was obtained.

EXAMPLE 29

| | (a) | (b) |
|---|---|---|
| Chicken fat, parts | 50.0 | 50.0 |
| Decaglycerol decastearate, parts | 1.0 | 1.0 |
| Dextrin, parts | 48.0 | 47.5 |
| Sodium caseinate, parts | | 0.5 |

Both formulations, 29(a) and 29(b), were made up as 35% total solids in water, pasteurized and homogenized at 1500 p.s.i. and spray dried with a 69/20 nozzle.

EXAMPLE 30

| | Kilograms |
|---|---|
| Liquid cottonseed oil | 1.17 |
| Decaglycerol tristearate | 0.05 |
| Lactose | 5.05 |

This formulation was pasteurized and homogenized in 2.9 gallons of water. A good emulsion was obtained. The product was spray dried to give a good powder.

EXAMPLE 31

| | (a) | (b) |
|---|---|---|
| Liquid cottonseed oil, kilograms | 2.34 | 2.925 |
| Decaglycerol tristearate, kilograms | 0.06 | 0.075 |
| Lactose, kilograms | 3.80 | 3.20 |
| Water, gallons | 2.9 | 2.8 |

Good homogenized emulsions were obtained in both Examples 31(a) and 31(b). After spray drying a very good product was obtained.

When the emulsifier was omitted from Examples 30 and 31(a) and (b), no emulsion was obtained and it was difficult to spray dry the product. When mono and diglycerides were substituted for the polyglycerol esters in Examples 30 and 31(a) and (b) only a fair emulsion was obtained. When Tween (oxyethylated sorbitan oleate) was employed in place of the polyglycerol esters only a weak emulsion was obtained after homogenizing and upon spray drying the product was a greasy wet mass.

EXAMPLE 32

| | |
|---|---|
| Liquid cottonseed oil, kilograms | 2.925 |
| Decaglycerol tristearate, kilogram | 0.075 |
| Sweetose (62 D.E. corn syrups solids) kilograms | 3.76 |
| Water, gallons | 2.7 |

The homogenized and pasteurized product gave a very good stable emulsion. The product dried to a white powder which was somewhat tacky.

EXAMPLE 33

| | Parts |
|---|---|
| White Crest | 39.0 |
| Decaglycerol tristearate | 1.0 |
| Cane sugar | 40.0 |
| Frodex 15 | 7.4 |
| Methocel (90 HG) | 3.0 |

This mixture was pasteurized and homogenized at 35% total solids in water to give an excellent emulsion which was stable and was spray dried to give a good powder.

A good emulsion was also obtained by omitting the Methocel.

EXAMPLE 34

| | Parts |
|---|---|
| Decaglycerol monostearate | 50.0 |
| Cottonseed oil | 10.0 |
| Sodium caseinate | 20.0 |
| Frodex 15 | 20.0 |

This mixture was pasteurized and homogenized at 25% total solids in water to give a stable emulsion which was spray dried to give a good powder. The product was useful as a substitute for lecithin in formulations containing fats and/or carbohydrates.

EXAMPLE 35

| | Parts |
|---|---|
| Hydrogenated cottonseed oil | 39.0 |
| Decaglycerol monostearate | 1.0 |
| Cane sugar | 40.0 |
| Frodex 15 | 17.0 |
| Carboxymethyl cellulose | 3.0 |

The product was homogenized in water at 35% solids and spray dried to a good powder.

EXAMPLE 36

| | Parts |
|---|---|
| White Crest | 60.6 |
| Mono and diglycerides | 4.8 |
| Decaglycerol tristearate | 3.1 |
| Sodium caseinate | 6.25 |
| Cane sugar | 12.50 |
| Frodex 15 | 12.50 |
| Sodium alginate | 0.05 |
| Salt | 0.23 |

This mixture was pasteurized and homogenized at 500 p.s.i. in water at 55% total solids. The product was spray dried using a large nozzle. The product whipped fairly stiff in 4 minutes with an electric mixer.

EXAMPLE 37

| | Parts |
|---|---|
| Methocel (MC type 15 cps. grade) | 70 |
| Decaglycerol tristearate | 1 |
| Cottonseed oil | 29 |

This was emulsified and homogenized at 5% solids and then spray dried.

EXAMPLE 38

Example 11 was repeated replacing decaglycerol tristerate with triglycerol monostearate and replacing decaglycerol decastearate with decaglycerol monostearate. The coffee whitener obtained was even more superior than Example 11.

We claim:

1. A composition in which volatiles are prevented from going off consisting essentially of a spray dried emulsion of (1) a polyglycerol partial ester of a higher fatty acid, (2) a carbohydrate selected from the group consisting of water soluble starch, modified starch other than water soluble starch, dextrin, sucrose, glucose, maltose, lactose, gum arabic, larch gum and corn syrups having a D.E. value of at least 4, and (3) an essential oil.

2. A composition according to claim 1 wherein the carbohydrate is gum arabic.

3. A composition according to claim 2 containing 19.5 parts essential oil, 0.5 part decaglycerol tristearate and 80 parts gum arabic.

4. A composition according to claim 1 wherein the ingredients are employed in amounts sufficient that volatiles are prevented from going off and the product is granular.

5. A composition according to claim 1 wherein the carbohydrate is gum arabic and the composition contains 19.5 parts essential oil, 0.5 part decaglycerol monostearate and 80 parts gum arabic.

References Cited
UNITED STATES PATENTS

| | | | |
|---|---|---|---|
| 2,024,356 | 12/1935 | Harris | 99—123 X |
| 2,132,436 | 10/1938 | Reynolds et al. | 99—123 UX |
| 2,754,215 | 7/1956 | Evans et al. | 99—140 |
| 2,913,342 | 11/1959 | Cameron et al. | 99—139 |

ALVIN E. TANENHOLTZ, Primary Examiner

J. M. HUNTER, Assistant Examiner

U.S. Cl. X.R.
426—222